United States Patent
Lang et al.

(10) Patent No.: US 9,454,852 B2
(45) Date of Patent: Sep. 27, 2016

(54) ELECTRONIC ACCESS AUTHORIZATION AND METHOD FOR ITS USE

(71) Applicant: SKIDATA AG, Groedig/Salzburg (AT)

(72) Inventors: Christian Lang, Haigermoos (AT); Anton Scheiber, Zell am See (AT)

(73) Assignee: SKIDATA AG, Groedig/Salzburg (AT)

( * ) Notice: Subject to any disclaimer, the term of this patent is extended or adjusted under 35 U.S.C. 154(b) by 0 days.

(21) Appl. No.: 14/931,971

(22) Filed: Nov. 4, 2015

(65) Prior Publication Data

US 2016/0125661 A1 May 5, 2016

(30) Foreign Application Priority Data

Nov. 4, 2014 (EP) .................................. 14191667

(51) Int. Cl.
| | |
|---|---|
| *G06K 5/00* | (2006.01) |
| *G07B 5/04* | (2006.01) |
| *G07B 11/02* | (2006.01) |
| *G06K 7/14* | (2006.01) |
| *G07B 15/00* | (2011.01) |

(52) U.S. Cl.
CPC ............... *G07B 5/04* (2013.01); *G06K 7/1413* (2013.01); *G07B 11/02* (2013.01); *G07B 15/00* (2013.01)

(58) Field of Classification Search
CPC .......... G06K 5/00; G06K 7/01; G06K 19/00; G06F 17/00; G06F 7/00
USPC ....................... 235/382, 375, 487, 382.5, 376
See application file for complete search history.

(56) References Cited

U.S. PATENT DOCUMENTS

| | | | | |
|---|---|---|---|---|
| 2002/0169539 A1* | 11/2002 | Menard | ................... | G01C 21/26 701/532 |
| 2005/0070257 A1 | 3/2005 | Saarinen et al. | | |
| 2008/0208681 A1 | 8/2008 | Hammad et al. | | |
| 2011/0050390 A1* | 3/2011 | Denison | ................ | B60R 25/102 340/5.51 |
| 2012/0222092 A1* | 8/2012 | Rabii | ............... | H04N 21/41407 726/4 |
| 2013/0191139 A1* | 7/2013 | Chen | ................... | G06F 19/3456 705/2 |

FOREIGN PATENT DOCUMENTS

| | | |
|---|---|---|
| EP | 1069539 A2 | 7/2000 |
| WO | 2008009654 A2 | 1/2008 |

OTHER PUBLICATIONS

European Search Report Dated May 20, 2015 of Corresponding EP Application No. 14 191 667.6.

* cited by examiner

*Primary Examiner* — Edwyn Labaze
(74) *Attorney, Agent, or Firm* — Karl F. Milde, Jr.; Eckert Seamans Cherin & Mellott, LLC

(57) ABSTRACT

An electronic access authorization system maintains location-dependent and/or time-dependent validity data which can be read out wirelessly by an access control device (4), which data can be acquired online or, in the case of an accreditation, can be requested online as a special form of access authorization, and which can be transferred following successful issuance in electronic form to an electronic terminal (1) of a user. Changes, on the part of the issuer of the access authorization, to the validity data of the access authorization can be transferred via a data communication connection between a server (2) of the issuer of the access authorization and the electronic terminal (1) to the electronic access authorization stored in the electronic terminal (1) and displayed on a display device (5) of the electronic terminal.

12 Claims, 1 Drawing Sheet

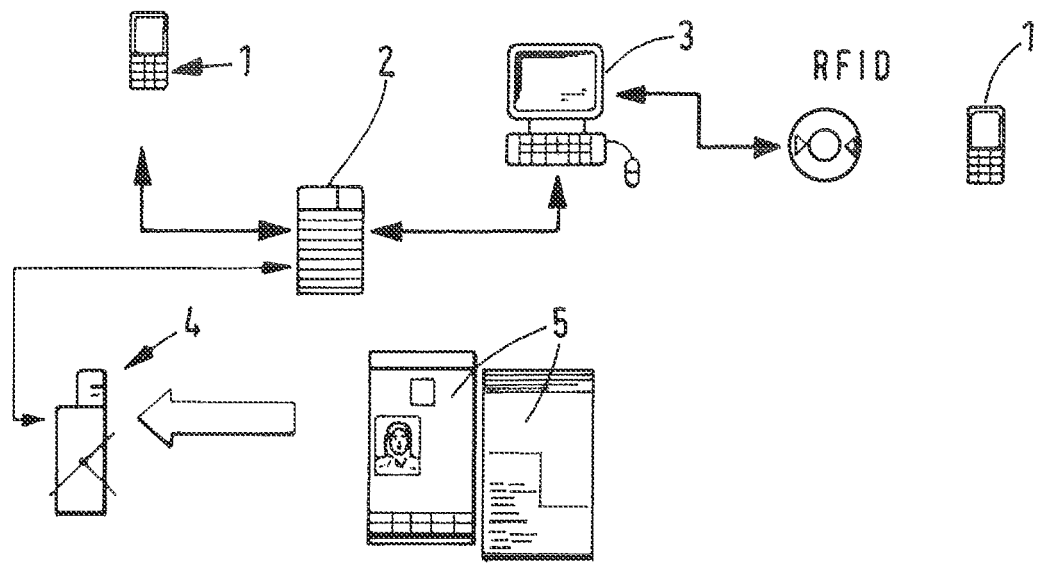

ELECTRONIC ACCESS AUTHORIZATION AND METHOD FOR ITS USE

BACKGROUND OF THE INVENTION

The present invention relates to an electronic access authorization system. Furthermore the invention relates to a method for using an electronic access authorization system according to the invention.

Electronic tickets/electronic access authorizations are well known in the art. They are a paperless replacement for a ticket or a pass and, as a rule contain a contactless data record which is read out wirelessly by an appropriate access control device. For example, the data records corresponding to an electronic ticket and stored in a portable device can be read out by an access control device via RFID technology. Furthermore it is possible to display a data record corresponding to an electronic ticket by means of a barcode via the display device of a mobile terminal such as a mobile phone, wherein the data is read out by means of a barcode scanner without making contact in order to grant access in the case of a valid access authorization.

A special type of access authorization are the so-called accreditations; i.e. the permissions granted to certain persons such as media representatives to attend certain types of events. Accreditations are used, as a rule, to determine who may, when and where, attend an event.

With events, however, it may often happen that the time and/or the location have to be changed as a result of external circumstances, which means that in this case the participants/clients who are in possession of an appropriate access authorization or persons who have an accreditation allocated to them, have to be notified of the change. In systems according to the state of the art this involves considerable expenditure. In the case where participants, clients or accredited persons are not notified in good time, this means a considerable loss of time and expense for these persons and also a loss of image for the event organisers, involving a high level of staff in order to rebook venues, issue new access authorizations, adapt accreditations and direct the flow of people to the new event venue.

Furthermore electronic access authorizations, once issued, cannot be subsequently changed or adjusted. For example, a client cannot, without difficulty, alter a seat reservation by means of the acquired access authorization. Rather he/she must personally, or by electronic means, get in contact with the event organiser, In order to obtain a new access authorization.

SUMMARY OF THE INVENTION

It is a principal objective of the present invention to provide an electronic access authorization system through the use of which the aforementioned disadvantages are avoided. A further objective is to provide a method for using the electronic access authorization system according to the invention.

These objectives, as well as other objectives which will become apparent from the discussion that follows, are achieved, in accordance with the present invention, by providing an electronic access authorization system which maintains location-dependent and/or time-dependent validity data that can be read out wirelessly by an access control device, such as a mobile phone, which data can be acquired online or, in the case of an accreditation, can be requested online as a special form of access authorization, and which can be transferred following successful issuance in electronic form to an electronic terminal of a user. Changes, on the part of the issuer of the access authorization, to the validity data of the access authorization can be transferred via a data communication connection between a server of the issuer of the access authorization and the electronic terminal to the electronic access authorization stored in the electronic terminal and displayed on a display device of the electronic terminal.

Accordingly an electronic access authorization is proposed which can be acquired online, for example via a smartphone or a computer or via a POS terminal or, in the case of an accreditation, can be applied for online and which can be transferred in electronic form to an electronic, preferably portable terminal of a user following its successful issue. The access authorization can be read out contactlessly by means of a suitable access control device, which for example may be realised as an RFID reading means or a barcode scanner.

According to the invention the electronic access authorization contains location-dependent and time-dependent validity data, for example the location, time and seat reservation for an event or the location and time of the availability of the reserved service or a validity time-span and a validity area displayed to the user, wherein changes on the part of the issuer of the access authorization regarding the validity data can be transferred to the access authorization by means of a data communication connection between a server, who has issued the access authorization, and the electronic terminal, and displayed.

This may, for example, be done via a push-message, which contains information about the change and transfers this to the electronic access authorization stored in the electronic terminal.

According to a further development of the invention, the user is informed via an optical and/or acoustic signal generated via the electronic terminal, in case any changes are about to be or have been made to the location-dependent and/or time-dependent validity data of an electronic access authorization on the part of the issuer of the access authorization. This signal may be generated, for example, via a push-message, which contains information about the change and transfers this to the electronic access authorization stored in the electronic terminal, thereby updating it.

As part of a further development of the invention the electronic access authorization can also be adapted on the part of the user. The user is able, via a graphic user interface of the electronic access authorization, shown to him on a display device of the electronic terminal, to enter desired changes to the location-dependent and/or time-dependent validity data via a touchscreen or via menus, which changes can be transferred by means of a data communication connection to the server of the issuer of the access authorization, where the data is checked and possibly accepted, wherein the user is notified, e.g. in a push-message, via a connection of his electronic terminal to the server of the issuer, whether his changes have or have not been accepted.

The changes accepted by the issuer of the electronic access authorization are transferred to the electronic access authorization preferably in real time. This may be effected for example via a push-message, which contains information about the accepted changes and which transfers these changes to the electronic access authorization stored in the electronic terminal, thereby updating the same.

The user can be notified via an optical and/or acoustic signal, which is generated via the electronic terminal during or after receipt of the changes. This signal can be generated for example via the push-message, which contains information on the changes and which transfers these changes to the electronic access authorization stored in the electronic terminal, thereby updating the same.

The changes to the location-dependent and/or time-dependent validity data desired by the user may be subject to a charge and for example are referred to as so-called upgrades, such as an upgrade to a higher ticket category or the acquisition of additional service packets such as a packed lunch or a SPA visit in a ski resort. To do this, there is no need for the user to retrieve a special software, rather he can request these changes directly via the graphic user interface of the electronic access authorization via a touchscreen or via menus as already explained, wherein if the desired changes can be accepted, e.g. if upgrades are available, the user is notified for example in a push-message via the data communication connection between the electronic terminal and the server of the issuer, and an appropriate payment process can be effected via the data communication connection between the electronic terminal and the server of the issuer of the access authorization on the basis of credit card data or account data stored in the electronic terminal or on the server of the issuer of the access authorization, or which data has to be manually entered. Once payment has been carried out, the accepted changes are transferred, preferably in real time, via e.g. a push-message, to the electronic access authorization in the electronic terminal of the user.

The inventive concept of a bi-directionally adaptable electronic access authorization leads to an improvement in comfort for issuers of access authorizations/event organisers and clients/accredited persons and to a reduction in logistic expenditure.

The invention will now be explained in more detail by way of an example with reference to the attached FIGURE.

BRIEF DESCRIPTION OF THE DRAWING

The single FIGURE (FIG. 1) is a block diagram of the system to which the present invention relates.

DETAILED DESCRIPTION OF THE PREFERRED EMBODIMENTS

Referring to FIG. 1, an electronic terminal 1 of a user, which in the example is realised as a mobile phone, is provided to communicate with the electronic access authorization system according to the invention. The electronic terminal may instead be a so-called "tablet," PDA or a portable computer. The electronic access authorization according to the invention can be acquired online, e.g. by means of an Internet connection of the mobile phone 1 to a server 2 of the issuer of the access authorization. Once this authorization has been issued, it is transferred online to the mobile phone 1. Alternatively the access authorization may be obtained at a desk 3 or a machine, wherein the access authorization is subsequently transferred to the mobile phone 1 via RFID, Bluetooth®, email or SMS.

In case the access authorization is an accreditation, this can be requested online via an electronic terminal such as a mobile phone 1, and this is then be transferred after issuance in electronic form to the electronic terminal 1 of the user. Or the accreditation may be requested at a desk 3, wherein, following issuance, it is transferred to the mobile phone 1 via RFID, Bluetooth®, email or SMS.

The access authorization, also realised as an accreditation, can be read contactlessly by means of a suitable access control device 4 connected e.g. with the server 2 of the issuer of the access authorization for the purpose of data communication and realised, for example, as a RFID reader or a barcode scanner.

In order to permit a contactless read-out by means of RFID technology, the electronic terminal comprises the required RFID functionality, wherein a read-out is made possible using a barcode scanner by displaying a respective barcode by means of a display device of the electronic terminal. Furthermore the access authorization/accreditation can be checked manually, wherein to this end, the same can be displayed in a manner readable for personnel by means of a display device 5 of the electronic terminal. In case of an accreditation a picture of the accredited person may also be displayed.

As part of a further development pseudonyms can be used in case of an accreditation, in order not to reveal the identity of the user (e.g. of a VIP). To this end a pseudonym for the name can be entered via the display device 5 of the electronic terminal 1, wherein the real name is stored in the system of the issuer of the accreditation.

The electronic access authorization contains location-dependent and/or time-dependent validity data, for example the location, time and details about a seat reservation for an event or the location and time of the availability of a booked service or a validity timespan and a validity area (e.g. a day ski pass for a certain ski resort), which is displayed to the user via the display device 5 of the electronic terminal 1, wherein changes by the issuer of the access authorization regarding the validity data, which may be the case due to e.g. a date change for a concert or due to a change in time and/or venue for a press conference, are transferred to the electronic access authorization stored in the electronic terminal 1, thereby updating the access authorization with the new validity data, by means of a data communication connection between the server 2 of the issuer of the access authorization and the electronic terminal 1 preferably in real time and displayed to the user on the display device 5 of the electronic terminal 1.

This is preferably effected via a push-message, which contains information on the change and which transfers this to the electronic access authorization stored in the electronic terminal 1 thus updating the same. The push-message may preferably be used to generate an optical and/or acoustic signal in order to draw the user's attention to the changes.

According to an advantageous further development of the invention the electronic access authorization can also be adapted/altered on the part of the user. To this end the user can enter desired changes of the location-dependent and/or time-dependent validity data on a touchscreen of the electronic terminal via a graphic user interface of the electronic access authorization displayed to him via the display device 5 of the electronic terminal 1, which changes are transferred by means of a data communication connection to the server 2 of the issuer of the access authorization, where they are checked and accepted, as the case may be, wherein the user is notified via a connection of his electronic terminal 1 with the server 2 of the issuer, for example via a push-message, whether or not the changes have been accepted.

The changes accepted by the issuer of the electronic access authorization are preferably transferred to the electronic access authorization in real time, thereby updating the access authorization with the new validity data. This may for example be effected via a push-message as already explained in the case of changes on the part of the issuer of the electronic access authorization.

There has thus been shown and described a novel electronic access authorization and method for its use which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. An electronic access authorization method that maintains, in an electronic server of an issuer of access authorization, access authorization validity data that is read out wirelessly by means of an access control device, which access authorization can be acquired online, or requested online in the case of an accreditation, as a special form of access authorization and transferred, following issuance thereof, in electronic form, to an electronic terminal of a user having a display device, the improvement wherein the access authorization data is at least one of (1) location-dependent and (2) time-dependent and wherein changes, on the part of the issuer of the access authorization, to the validity data of the access authorization are transferred by means of a data communication connection between the server of the issuer and the electronic terminal of the user to the electronic access authorization stored in the electronic terminal, and are displayed on the display device of the electronic terminal.

2. The electronic access authorization method according to claim 1, wherein, in the case of changes to the at least one location-dependent and time-dependent validity data on the part of the issuer of the access authorization, the user is notified during or after receipt of the changes.

3. The electronic ace horization method according to claim 1, wherein the changes to the at least one location-dependent and time-dependent validity data on the part of the issuer of the access authorization are transferred via a push-message containing information about the changes to the electronic access authorization stored in the electronic terminal.

4. The electronic access authorization method according to claim 1, wherein changes to the at least one location-dependent and time-dependent validity data, which are desired by the user, can be entered by the user on a touchscrecn or via menus, on a graphic user interface of the electronic access authorization that is displayed on the display device of the electronic terminal and transferred over the data communication connection to the server of the issuer of the access authorization, where it is checked; wherein the user is notified via the data communication connection between the electronic terminal and the server of the issuer, as to whether t the changes are accepted; wherein if the changes are accepted, these changes are transferred over the a data communication connection between the server of the issuer of the access authorization and the electronic terminal to the electronic horization in the electronic terminal and displayed on the display device of the electronic terminal.

5. The electronic access authorization method according to claim 4, wherein for chargeable desired changes to the at least one location-dependent and time-dependent validity data by the user, a payment process is performed on the basis of credit card or account data manually entered or stored in the electronic terminal or on the server of the issuer of the access authorization via the data communication connection between the electronic terminal of the user and the server of the issuer of the access authorization.

6. The electronic access authorization method according to claim 4, wherein the user, upon acceptance of the desired changes to the at least one location-dependent and time-dependent validity data of an electronic access authorization, is notified via at least one of an optical and acoustic signal, which is generated by the electronic terminal upon receipt of the changes accepted by the issuer of the electronic ac authorization.

7. The electronic access authorization method according to claim 4, wherein the accepted changes to the at least one location-dependent and time-dependent validity data of an electronic access authorization can be transferred to the electronic access authorization stored in the electronic terminal via a push-message which contains information about the changes.

8. In a method for using an electronic access authorization system, wherein the system maintains at least one of (1)location-dependent and (2)time-dependent access authorization validity data which can be read out wirelessly by an access control device and can be acquired online or, in case of an accreditation, can be requested as a special form of access authorization, and transferred in electronic form to an electronic terminal of a user, the improvement wherein changes made by the issuer of the access authorization the validity data of the access authorization are transferred to the electronic access authorization stored in electronic terminal via a data communication connection between a server of the issuer of the access authorization and the electronic terminal, whereby the access authorization is updated with the new validity data and displayed via a display device of the electronic terminal.

9. The method for using an electronic access authorization system according to claim 8, wherein, in the case of changes to the at least one location-dependent and time-dependent validity data on the part of the issuer of the access authorization, the user is notified via at least one of an optical and acoustic signal, which is generated by the electronic terminal upon receipt of the changes.

10. The method for using an electronic access authorization system according to claim 8, wherein changes to the at least one location-dependent and time-dependent validity data made by the issuer of the access authorization are transferred to the electronic access authorization stored in the electronic terminal via a push message which contains information about the changes.

11. The method for using an electronic access authorization system according to claim 8, wherein changes to the at least one location-dependent and time-dependent validity data desired by the user are entered by the user on a touchscreen or via menus, via a graphic user interface, of the electronic access authorization displayed to him via a display device of the electronic terminal and are transferred via a data communication connection to the server of the issuer of the access authorization, where it is checked, wherein the user is notified via a data communication connection between the electronic terminal and the server of the issuer, whether or not the changes have been accepted, wherein if changes have been accepted, these changes are transferred to the electronic access authorization in the electronic terminal over a data communication connection between the server of the issuer of the access authorization and the electronic terminal, whereby the access authorization with the new validity data is updated and displayed on the display device of the electronic terminal.

12. The electronic access authorization system according to claim 11, wherein, in the case of chargeable desired changes to the at least one location-dependent and time-dependent validity data on the part of the user, a payment process is performed based on credit card data or account data entered manually or stored in the electronic terminal or on the server of the issuer of the access authorization via the data communication connection between the electronic terminal and the server of the issuer of the access authorization.

* * * * *